United States Patent [19]

Rauch et al.

[11] Patent Number: 4,892,932

[45] Date of Patent: Jan. 9, 1990

[54] METHOD FOR SPRAY DRYING POLYMER EMULSIONS AND SOLUTIONS

[75] Inventors: Hubert Rauch, Weiterstadt; Peter J. Arndt, Seeheim-Jugenheim, both of Fed. Rep. of Germany

[73] Assignee: Röhm GmbH, Darmstadt, Fed. Rep. of Germany

[21] Appl. No.: 315,381

[22] Filed: Feb. 24, 1989

[30] Foreign Application Priority Data

Mar. 8, 1988 [DE] Fed. Rep. of Germany ....... 3807543

[51] Int. Cl.$^4$ .............................. C08J 3/12; C08J 3/16
[52] U.S. Cl. ...................................... 528/499; 264/11; 264/13; 528/501; 523/342
[58] Field of Search ............... 528/499, 486, 488, 490, 528/501; 523/340, 342, 352; 428/402

[56] References Cited

U.S. PATENT DOCUMENTS 3,805,869  4/1974  Winter et al. ..................... 239/398
4,112,215  9/1978  Boessler et al. .................... 523/113

FOREIGN PATENT DOCUMENTS 2512238  5/1976  Fed. Rep. of Germany .

Primary Examiner—Joseph L. Schofer
Assistant Examiner—Thomas R. Weber
Attorney, Agent, or Firm—Curtis, Morris & Safford

[57] ABSTRACT

The formation of interfering polymer deposits in spary drying apparatus during the spray drying of aqueous dispersions or solutions of polymers in a stream of warm air is avoided if water is atomized together with the dispersion or solution.

10 Claims, No Drawings

METHOD FOR SPRAY DRYING POLYMER EMULSIONS AND SOLUTIONS

The present invention relates to a method for making spray dried polymer powders by atomizing an aqueous dispersion or solution of a polymer in a warm air stream and separating the polymer powder from the warm air stream.

It is known to prepare powdered emulsion polymers by the spray drying of aqueous polymer dispersions. In this, a careful control of temperature in the spraying tower has proved advantageous for preparing unglazed polymer powders or powders from dispersions having low minimum film forming temperatures (MFT).

DE-C No. 25 12 238 describes the preparation of a powdered acrylic resin having a high content of carboxyl groups by the spray drying of an aqueous dispersion. It is there indicated as essential to not exceed the MFT in the spray drying process.

Aqueous polymer dispersions with high solids contents of, for example, 40 to 60 percent by weight are sensitive systems which tend to form deposits and coagulates at elevated temperatures or under the influence of shearing forces. This is particularly true for dispersions having a low MFT, for example under 60° C., and for dispersions of emulsion polymers having a low dynamic glass transition temperature ($T_{\lambda max}$). Because of this sensitivity, considerable difficulties are often encountered in the spray drying of aqueous polymer dispersions. When flowing onto the rapidly rotating atomizer disk, the dispersion is heated by frictional forces and is subjected to strong shearing forces. Deposits in the liquid distributor and on the atomization disk of the spray drying apparatus are the result.

Similar difficulties occur during the spray drying of aqueous polymer solutions.

The problem to be solved by the invention is to avoid the aforementioned difficulties in the atomization of aqueous dispersions and solutions, particularly in the spray drying of temperature sensitive and shear sensitive dispersions having an MFT below 60° C. and a dynamic glass transition temperature of the emulsion polymer below 150° C.

It has been found that this problem is solved if water is atomized together with the dispersion or solution. In this way, polymer deposits in the liquid distributor and in the atomization apparatus are prevented. This is not brought about by any dilution effect, since the addition of water to the dispersion or the solution itself has no corresponding effect. Rather, it can more likely be assumed that the water acts as a coolant and discourages temperature dependent coagulation and deposition processes. To the extent that small amounts of deposits may nevertheless arise, they can be more readily removed than when they are formed in the absence of added water.

The dispersion or solution is atomized in a technical spray drying apparatus preferably by means of a rapidly rotating disk. The preferred disk velocity is mostly in the range from 5000 to 25000 revolutions per minute (rpm). It is suitable to let the dispersion or solution and the water flow simultaneously, but separately, onto the rapidly rotating disk. For this purpose, an atomization apparatus is suitably outfitted with one or more supplementary supply lines such that one or more outlet openings in the liquid distributor are located directly over the atomizer disk and the water can flow directly over the atomizer disk directly, but separately from the dispersion or solution.

The amount of water added per unit time is, as a rule, smaller than the amount of dispersion or solution atomized in the same time period, for example 1 to 20 percent by weight thereof. Preferably, 2.5 to 7.5 percent of water, in each case based on the amount of dispersion or solution, are used. The effect of the water is generally not adversely affected if it contains limited amount of dissolved or dispersed materials, so long as they do not noticeably increase viscosity or do not bring about undesired interactions with the dispersion or solution. Possible contents are, for example, surfactants and nonvolatile additives which serve to modify the polymer powder.

In a drying tower, the air stream is conventionally led in concurrent with the dispersion or solution sprayed thereinto, i.e. from top to bottom through the drying tower. The air stream is conducted from the exit of the drying tower into one or more cyclone separators where the dried polymer powder is separated. The powder contains at most a residual moisture between 1 and 5 percent by weight.

The air introduced into the drying tower as a rule has a temperature in the region from 50° C. to 200° C., preferably from 60° C. to 120° C. The air temperature, as a result of the energy absorbed in the evaporation of the water, decreases from top to bottom and the air exits at 30° C. to 100° C., preferably at 30° C. to 50° C. The difference between the entry and exit temperatures ($T_E/T_A$) depends on the relative amounts of air and atomized dispersion and can be controlled through this relationship.

According to a preferred embodiment of the invention, the dispersion is dried at an entry temperature $T_E$ below the dynamic glass transition temperature but above the MFT and at an exit temperature $T_A$ below 65° C. but above the MFT. It is further preferred that the amount of dry air introduced in the spray drying is so adjusted with respect to the amount of sprayed dispersion that the difference between the entry and exit temperatures ($T_E-T_A$) does not exceed 65° C.

If dispersions are used in the process of the invention, then they should suitably have as high a solids content as possible. This can lie between 10 and 60, preferably between 20 and 50, percent by weight. In order to be able to spray the dispersion into fine droplets, its viscosity should not be above 4000 mPa.s. A viscosity below 1000, and particularly below 100, mPa.s is advantageous.

As a rule, the dispersion contains an anionic emulsifier, for example in a concentration of 0.03 to 3 percent by weight of the aqueous phase. In addition thereto, nonionic emulsifiers may be present, for example up to 5 percent by weight, and these may also be present as the sole emulsifier.

The dispersions used for spray drying can be prepared according to known methods. Although the invention can be used to advantage with every dispersion of a spray dryable emulsion polymer, because of the increased energy demand corresponding to the amount of water added it will in practice be used only in those cases in which the dispersion without water addition can only by spray dried with difficulty or not at all.

Among the difficultly sprayable dispersions which can be processed with particular advantage according to the method of the invention are such whose minimum film forming temperature (MFT) is at least 50° C.

below the dynamic glass transition temperature, and particularly those whose MFT is below 60° C. The dynamic glass transition temperature $T_{\lambda-max}$) is preferably below 150° C.

A group of dispersions to which the aforementioned criteria as a rule pertain include emulsion polymers comprising 20 to 70 percent by weight of units of acrylic acid or of methacrylic acid, 40 to 80 percent by weight of units of lower alkyl esters of acrylic acid and/or methacrylic acid or mixtures thereof with styrene, as well as up to 10 percent by weight of units of other unsaturated free radically copolymerizable comonomers.

Aqueous solution of water soluble polymers can also advantageously be spray dried according to the method of the invention. Typical polymers of this kind comprise at least 50 percent by weight of acrylic acid or methacrylic acid or the water soluble salts thereof, any balance comprising other monomers copolymerizable therewith, such as acrylamide, methacrylamide, acrylonitrile or methacrylonitrile, and alkyl esters or hydroxyalkyl esters of acrylic acid or of methacrylic acid. The lower limit of the content of acrylic acid or of methacrylic acid is set only by the water solubility.

Aqueous polymer solutions are sprayable if their viscosity is not above 2000 mPa.s, and is preferably below 500 mPa.s. The solution viscosity is dependent on molecular weight and on solids content, and also on the salt content for polyelectrolytes. Solutions of polyacrylic acid having a molecular weight below 2000 can only be spray dried at solids contents up to 50 percent by weight, whereas at a molecular weight of 50,000 only concentrations up to 30 percent by weight are still workable.

The spray dried polymer powder as a rule consists of powder grains of an average size of about 50 microns ($\mu$). In a microphotograph, the grains at 100x appear sharply defined and translucent to transparent, which suggests a more or less strong glazing or melting of the latex particles.

The polymer powders are, for example, suitable for the preparation of medicament coatings or as thickening agents for aqueous alkali media.

A better understanding of the present invention and of its many advantages will be had be referring to the following specific examples, given by way of illustration.

EXAMPLES

Example 1

An aqueous synthetic resin dispersion having a solids content of 30 percent by weight which contains a dispersed copolymer formed from 50 percent by weight of ethyl acrylate and 50 percent by weight of methacrylic acid having an average particle size of 100 nanometers, and 2.4 percent of an anionic emulsifier ("HOSTAPAL BV", conc., Hoechst AG), and adjusted to pH 2.6 was used for spray drying. The dispersion had a viscosity of 6 mPa.s, a minimum film forming temperature of 28° C., and a white point of 17° C. The dispersed copolymer had a dynamic glass transition temperature ($T_{\lambda-max}$) of 134° C. and a shear modulus of 1650 N/mm$^2$ at 20° C.

For spray drying, a spray tower was employed which had at its head an atomization disk rotating at 10,000 rpm and through which heated air at 80° C. to 90° C. was passed from top to bottom at 18,000 m$^3$/hour in concurrent with the material sprayed.

190 kg/hour of the aqueous dispersion was led onto the atomization disk by way of a tubular conduit at the head of the spray tower. By way of a second tubular conduit, 8–10 kg/hour of water were led to the atomization disk at the same time. At the foot of the tower, the dried copolymer was separated from the air stream at a temperature of 40° C.–50° C. in the form of a finely divided powder.

If the dispersion is diluted with the same amount of water, or if the water is omitted altogether, then deposits form on the atomizer disk after a short period of operation, which deposits heat up and char because of rubbing against the stationary parts of the atomization mechanism so that the product is contaminated with charred particles.

Example 2

An aqueous solution of a copolymer formed of 85 percent by weight of acrylic acid and 15 percent by weight of ethyl acrylate, having a weight average molecular weight of 1700 to 2000, a solids content of 49 percent by weight, a pH value of 1.5, and a viscosity of 210 mPa.s, is used for spray drying.

A spray drying apparatus was used which had an atomizer disk rotating at 20,000 rpm and through which air heated at 65° C.–70° C. was led from top to bottom at 1000 m$^3$/hour in cocurrent with the material sprayed. The exit temperature of the air was 40° C.–45° C.

By way of separate tubular conduits, 120 kg of the solution and 3–4 kg of water per hour were flowed onto the atomization disk. At the foot of the apparatus, a fine white polymer powder was obtained. If the solution was diluted with the same amount of water or if the added water was omitted entirely, disturbances of the kind described in Example 1 arose after a short time.

Example 3

The procedure of Example 2 was followed, but 100 kg/h of an aqueous solution of sodium polyacrylate (molecular weight 1700–2000) having a pH value of 7.5 and a viscosity of 133 mPa.s were used under otherwise equal conditions. The result corresponded with that of the previous Example.

We claim:

1. A method for making a spray dried polymer powder, which method comprises atomizing water and an aqueous dispersion or solution of a polymer in a warm air stream, the amount of water atomized per unit time being smaller than the amount of dispersion or solution, and separating the polymer powder from the warm air stream.

2. A method as in claim 1 wherein the dispersion or solution and the water are atomized by means of a rapidly rotating disk.

3. A method as in claim 2 wherein the dispersion or solution and the water are concurrently, but separately, flowed onto the rapidly rotating disk.

4. A method as in claim 1 wherein said dispersion is a film forming dispersion having a minimum film forming temperature below 60° C.

5. A method as in claim 4 wherein said polymer is an emulsion polymer having a dynamic glass transition temperature, $T_{\lambda-max}$, below 150° C.

6. A method as in claim 1 wherein said aqueous dispersion is a dispersion of a polymer comprising 20 to 70 percent by weight of a member selected from the group consisting of acrylic acid, methacrylic acid, and the water soluble salts of these acids; 40 to 80 percent by weight of a member selected from the group consisting of lower alkyl esters of acrylic acid, lower alkyl esters of methacrylic acid, and mixtures of such esters with styrene; and up to 10 percent by weight of further, different, unsaturated, free radically polymerizable comonomers.

7. A method as in claim 1 wherein said dispersion has a minimum film forming temperature which is at least 50° C. below the dynamic glass transition temperature of the polymer therein.

8. A method as in claim 4 wherein said dispersion is dried by spray drying with warm air having an entry temperature below the dynamic glass transition temperature but above the minimum film forming temperature of the polymer in said dispersion and at an exit temperature below 65° C. but above the minimum film forming temperature of said polymer.

9. A method as in claim 1 wherein said aqueous solution is a solution of a polymer comprising at least 50 percent by weight of a member selected from the group consisting of acrylic acid, methacrylic acid, and the water soluble salts of these acids, the balance being other monomers copolymerizable therewith.

10. A method as in claim 1 wherein the amount of warm air introduced in spray drying is so adjusted with respect to the dispersion or solution sprayed that the temperature difference between the entry temperature and the exit temperature of the air is not greater than 65° C.

* * * * *